United States Patent
Yi et al.

(10) Patent No.: US 10,912,082 B2
(45) Date of Patent: Feb. 2, 2021

(54) WAYS FOR SUPPORTING MULTIPLE TTIS

(71) Applicant: LG Electronics Inc., Seoul (KR)

(72) Inventors: Yunjung Yi, Seoul (KR); Hyunho Lee, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 172 days.

(21) Appl. No.: 16/094,785

(22) PCT Filed: Apr. 19, 2017

(86) PCT No.: PCT/KR2017/004206
§ 371 (c)(1),
(2) Date: Oct. 18, 2018

(87) PCT Pub. No.: WO2017/183912
PCT Pub. Date: Oct. 26, 2017

(65) Prior Publication Data
US 2019/0132837 A1    May 2, 2019

Related U.S. Application Data

(60) Provisional application No. 62/324,874, filed on Apr. 19, 2016.

(51) Int. Cl.
*H04W 72/04*     (2009.01)
*H04W 72/12*     (2009.01)
(Continued)

(52) U.S. Cl.
CPC ....... *H04W 72/0446* (2013.01); *H04L 1/1854* (2013.01); *H04L 5/00* (2013.01); *H04L 5/0032* (2013.01); *H04L 5/0055* (2013.01); *H04W 72/0413* (2013.01); *H04W 72/1284* (2013.01); *H04L 5/001* (2013.01)

(58) Field of Classification Search
CPC combination set(s) only.
See application file for complete search history.

(56) References Cited

U.S. PATENT DOCUMENTS

2009/0245190 A1    10/2009  Higuchi et al.
2013/0039231 A1    2/2013   Wang
(Continued)

FOREIGN PATENT DOCUMENTS

WO    WO2016040290         3/2016
WO    WO-2016130175 A1 *   8/2016    .......... H04W 72/044
WO    WO-2017079530 A1 *   5/2017    ........ H04W 72/1242

OTHER PUBLICATIONS

International Search Report in International Application No. PCT/KR2017/004206, dated Jul. 20, 2017, 2 pages.
(Continued)

*Primary Examiner* — Yee F Lam
(74) *Attorney, Agent, or Firm* — Fish & Richardson P.C.

(57) ABSTRACT

The disclosure of the present invention proposes a method for monitoring control information. The method may be performed by a user equipment (UE) configured with an aggregation of a first cell and a second cell. The method may comprise: monitoring, by the UE, control information in a control region of at least one of the first and second cells. The first cell uses a first transmission time interval (TTI) and the second cell uses a second TTI.

12 Claims, 7 Drawing Sheets

(51) Int. Cl.
*H04L 5/00* (2006.01)
*H04L 1/18* (2006.01)

(56) References Cited

U.S. PATENT DOCUMENTS

| | | | | |
|---|---|---|---|---|
| 2014/0328277 | A1 | 11/2014 | Xiao et al. | |
| 2014/0362832 | A1* | 12/2014 | Rudolf | H04L 1/1822 370/336 |
| 2015/0334685 | A1* | 11/2015 | Ji | H04W 72/1247 370/330 |
| 2015/0334702 | A1* | 11/2015 | Ji | H04W 72/0453 370/280 |
| 2016/0227425 | A1* | 8/2016 | Kim | H04L 5/0007 |
| 2016/0255611 | A1* | 9/2016 | Damnjanovic | H04L 5/0087 370/330 |
| 2016/0309498 | A1* | 10/2016 | Luo | H04W 72/1268 |
| 2016/0337880 | A1* | 11/2016 | Nogami | H04W 72/044 |
| 2016/0338023 | A1* | 11/2016 | Nogami | H04L 27/2602 |
| 2016/0345206 | A1* | 11/2016 | Yerramalli | H04L 5/005 |
| 2017/0135127 | A1* | 5/2017 | Nogami | H04W 72/0453 |
| 2017/0230838 | A1* | 8/2017 | Yerramalli | H04W 16/14 |
| 2017/0285130 | A1* | 10/2017 | Kim | H04L 1/1812 |
| 2017/0318564 | A1* | 11/2017 | Lee | H04L 5/001 |
| 2018/0007673 | A1* | 1/2018 | Fwu | H04L 5/0092 |
| 2018/0242316 | A1* | 8/2018 | Takeda | H04W 72/0446 |
| 2018/0332605 | A1* | 11/2018 | Pelletier | H04W 72/1242 |
| 2018/0376474 | A1* | 12/2018 | Khoryaev | H04L 1/0007 |
| 2018/0376490 | A1* | 12/2018 | Lunttila | H04W 72/1268 |
| 2019/0007943 | A1* | 1/2019 | Takeda | H04W 72/0446 |
| 2019/0230695 | A1* | 7/2019 | Takeda | H04W 72/12 |
| 2020/0053675 | A1* | 2/2020 | Khoryaev | H04W 56/002 |

OTHER PUBLICATIONS

Huawei et al., "Consideration on multiplexing of non-sTTI and sTTI in the same carrier," 3GPP TSG RAN WG1 Meeting #84bis, dated Apr. 11-15, 2016, 6 pages.

* cited by examiner

Option 2

[Fig. 5b]

Option 3

PUCCH group 1 : CC1, CC2, CC3
PUCCH group 4 : CC4

[Fig. 9]

WAYS FOR SUPPORTING MULTIPLE TTIS

CROSS-REFERENCE TO RELATED APPLICATIONS

This application is a National Stage application under 35 U.S.C. § 371 of International Application No. PCT/KR2017/004206, filed on Apr. 19, 2017, which claims the benefit of U.S. Provisional Application No. 62/324,874, filed on Apr. 19, 2016. The disclosures of the prior applications are incorporated by reference in their entirety.

TECHNICAL FIELD

The present invention relates to mobile communication.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more and more communication devices require more communication capacity, there is a need for a new radio access technology (RAT) different from a legacy RAT for LTE/LTE-advanced.

In the new RAT, one of major goals is to reduce a latency. For the latency reduction, it is required to shorten the existing transmission-time-interval (TTI).

DISCLOSURE OF INVENTION

Technical Problem

However, there has not been studied about specific techniques about how to use the shortened TTI.

Solution to Problem

Accordingly, the disclosure of the specification has been made in an effort to solve the problem.

To achieve the foregoing purposes, the disclosure of the present invention proposes a method for monitoring control information. The method may be performed by a user equipment (UE) configured with an aggregation of a first cell and a second cell. The method may comprise: monitoring, by the UE, control information in a control region of at least one of the first and second cells. The first cell uses a first transmission time interval (TTI) and the second cell uses a second TTI.

The monitoring of the control information may include: considering that a cross-carrier scheduling is not supported if the first TTI for the first cell is different from the second TTI for the second cell in a length; and considering that a cross-carrier scheduling is supported if the first TTI for the first cell is the same as the second TTI for the second cell in a length.

If a length of the first TTI for the first cell is m times of a length of second TTI for the second cell, a cross-carrier scheduling may be configured such that the control information of the first cell indicates resource allocation of the second cell in m TTIs.

If the second TTI for the second cell is shorter than the first TTI for the first cell in a length, the second TTI may be used as a unit of a cross-carrier scheduling.

If the second TTI for the second cell is shorter than the first TTI for the first cell in a length, control information for the second cell may be received from the first cell in the second TTI.

The method may further comprise: configuration information indicating a length of TTI which is used by any cell for performing a cross-carrier scheduling.

To achieve the foregoing purposes, the disclosure of the present invention proposes a method for transmitting an uplink control channel. The method may be performed by a user equipment (UE) and comprise: transmitting the uplink control channel. Here, if the uplink control channel is generated based on a first transmission time interval (TTI) shorter than a second TTI, the transmission of the uplink control channel may be repeated m times within the second TTI.

The uplink control channel may include a plurality of hybrid automatic repeat request (HARQ) acknowledgements/negative-acknowledgements (ACKs/NACKs) which are multiplexed based on one identical TTI among the first and second TTIs.

The uplink control channel may not include a plurality of HARQ ACKs/NACKs which are multiplexed based on the first and second TTIs, respectively.

The method may further comprise: if a first uplink control channel generated based on the first TTI is overlapped on one or more orthogonal frequency division multiplexing (OFDM) symbols with a second uplink control channel generated based on the second TTI, puncturing the one or more OFDM symbols for the second control channel.

Here, the puncturing may be performed when the second TTI for the second uplink control channel is shorter than the first TTI for the first uplink control channel Also, the puncturing of the first uplink control channel may not affect multiplexing of uplink control channels.

Advantageous Effects of Invention

According to the disclosure of the present specification, the problems of the above-described prior art are solved.

MODE FOR THE INVENTION

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems including new RAT (NR) for 5G system. Hereinafter, LTE includes LTE and/or LTE-A.

Figure 1:
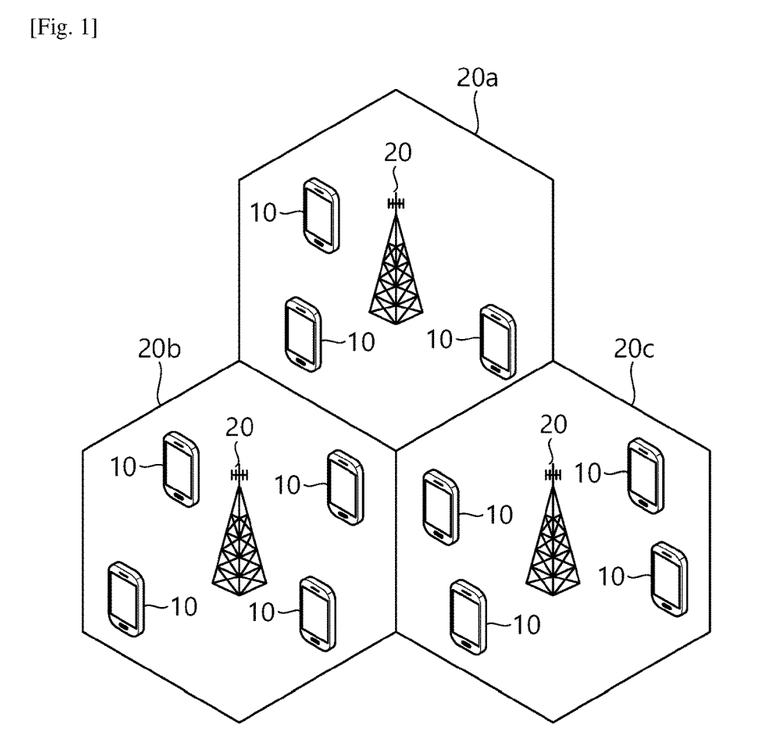
FIG. 1 illustrates a wireless communication system.

FIG. 1 Illustrates a Wireless Communication System.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Figure 2:
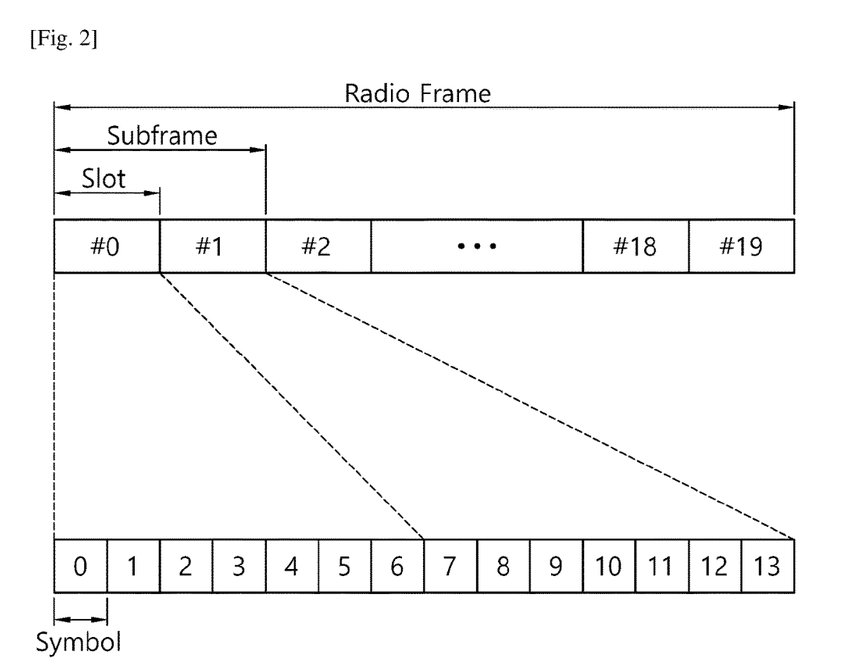
FIG. 2 shows a downlink radio frame structure according to FDD of 3rd generation partnership project (3GPP) long term evolution (LTE).

FIG. 2 shows a downlink radio frame structure according to FDD of 3rd generation partnership project (3GPP) long term evolution (LTE).

The radio frame includes 10 subframes indexed 0 to 9. One subframe includes two consecutive slots. Accordingly, the radio frame includes 20 slots. The time taken for one subframe to be transmitted is called a transmission time interval (TTI). For example, the length of one subframe may be 1 ms, and the length of one slot may be 0.5 ms.

The structure of the radio frame is for exemplary purposes only, and thus the number of subframes included in the radio frame or the number of slots included in the subframe may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

As such, one subframe is called as a transmission-time-interval (TTI). It is also noted that one slot (e.g., 7 symbols or 14 symbols) can be called as a transmission-time-interval for a given numerology. TTI refers to the duration of a transmission. So, the base station schedule the radio resource in unit of the TTI, e.g., subframe. With smaller number of OFDM symbols in TTI (e.g., less than 7 or 7) or with larger subcarrier spacings, short TTI (sTTI) is considered in LTE and NR. This invention discusses multiplexing issues between channels scheduled based on TTI and sTTI. In other words, with different scheduling interval and scheduling duration, multiplexing of multiple control/data channels are discussed.

<Carrier Aggregation>

Hereinafter, a carrier aggregation (CA) system will be described.

The CA system refers to aggregate a plurality of component carriers (CCs). Due to CA, the meaning of a legacy cell has been changed. According to CA, a cell may refer to a combination of a downlink (DL) CC and an uplink (UL) CC or a single DL CC.

Also, in CA, a cell may be classified as a primary cell, a secondary cell among serving cells. The primary cell refers to a cell operating in a primary frequency and refers to a cell in which a UE performs an initial connection establishment procedure or a connection re-establishment procedure with a BS (or an eNB) or a cell indicated as a primary cell during a handover procedure. The secondary cell refers to a cell operating in a secondary frequency, which is configured once RRC connection is established and which is used to provide additional wireless resource. Another separation is that PCell is always-activated carrier whereas SCell can be activated and deactivated via higher layer signaling.

As mentioned above, in the CC system, a plurality of CCs, i.e., a plurality of serving cells, may be supported, unlike a single carrier system.

In carrier aggregation system, cross-carrier scheduling has been proposed to allow scheduling flexibility in spite of different interference environments. The cross-carrier scheduling is a scheduling scheme that may conduct resource allocation of a physical uplink shared channel (PUSCH) transmitted through other component carriers than the component carrier basically linked to a specific component carrier and/or resource allocation of a physical downlink shared channel (PDCCH) transmitted through other component carriers through a physical downlink control channel (PDCCH) transmitted through the specific component carrier.

DISCLOSURE OF THE INVENTION

According to the disclosure of the invention, changes to a length of the TTI are discussed.

Figure 3:
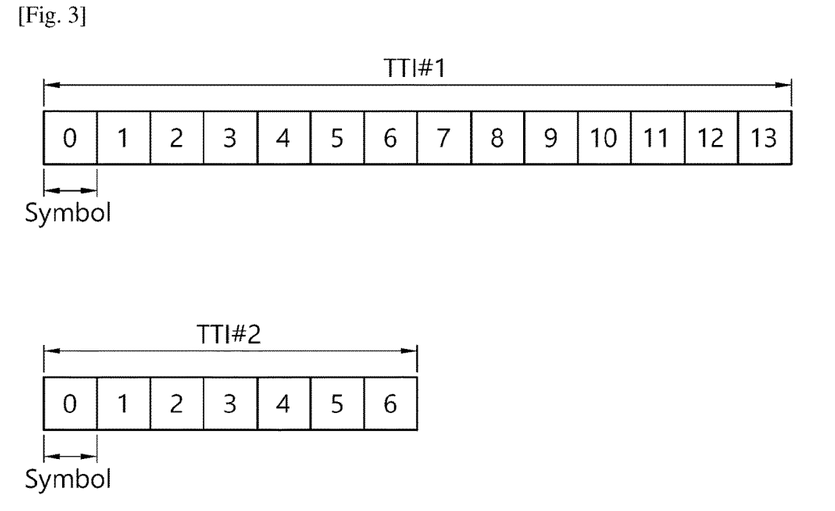
FIG. 3 illustrates an example of changes of the length of the TTI.

FIG. 3 illustrates an example of changes of the length of the TTI.

Referring to FIG. 3, compared with length of TTI #1, which is the same as one subframe shown in FIG. 2, the length of TTI #2 may be shortened. As such, different TTI lengths may be used in a next communication system.

Figure 4A:
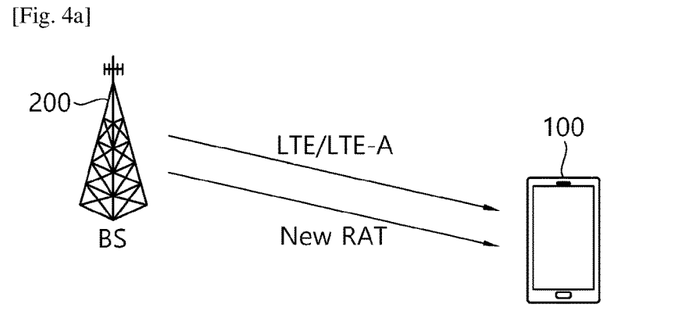
FIG. 4*a* illustrates an example of carrier aggregation using different TTIs and FIG. 4*b* illustrates an example of dual connectivity using different TTIs.
Figure 4B:
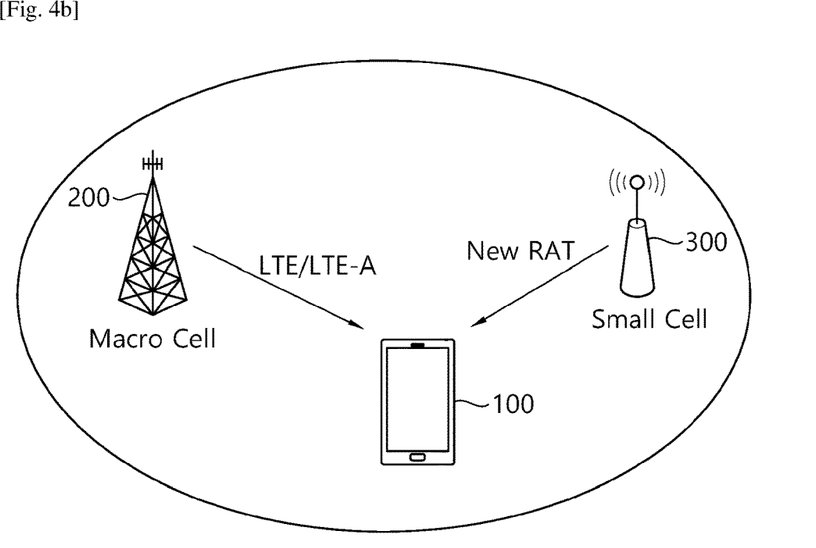

FIG. 4a illustrates an example of carrier aggregation using different TTIs and FIG. 4b illustrates an example of dual connectivity using different TTIs.

Referring to FIG. 4a, two carriers (e.g., first and second carriers) may be aggregated. For example, a first carrier may be used for a legacy radio access technology (RAT) such as LTE/LTE-A and a second carrier may be used for a new RAT. The first carrier for the legacy RAT may use the TTI #1 as shown in FIG. 3. And, the second carrier for the new RAT may use the TTI #2 as shown in FIG. 3. For the convenience, TTI length shorter than the other TTI length is called as sTTI in this invention.

Referring to FIG. 4b, the UE may have dual connectivity to a macro cell and a small cell. The macro cell may use LTE/LTE-A and the small cell may use a new RAT. The macro cell may use the TTI #1 as shown in FIG. 3. And, the small cell may use the TTI #2 as shown in FIG. 3.

As such, different TTI lengths and/or numerology can be aggregated. Some examples of carrier aggregations can be as the followings (but not limited to).

(1) Same numerology is used among carrier(s), with potentially different TTI length in each carrier (2) Same TTI length in all carriers with different subcarrier spacings or different numerology (3) TTI and numerology can be different in each carrier.

I. Case 1: Same Numerology and Different TTI Length

In Case 1, two alternative approaches can be further considered.

Alt 1: single carrier includes or consists of "single" TTI length from a UE perspective. In other words, a single TTI length is configured per carrier where the TTI length can be different per carrier.

Alt 2: more than one TTI length can be configured per carrier from a UE perspective.

Alt 2-1: all common control/data (e.g., cell common control information or cell common data) is operated with one TTI length (or is transmitted based on one TTI length), and all UE specific control/data is operated with another TTI length (single value) (or is transmitted based on another TTI length). If Alt2-1 is used, with the carrier configured for SCell, the different TTI length from TTI length used for common control/data or second TTI length configured to unicast control/data may be assumed. With this approach, a UE is expected to receive one TTI length for unicast traffic.

Alt 2-1: separate TTI can be configured or more than one TTI lengths can be configured to unicast control/data. With this approach, a UE may expect more than one TTI length used for unicast control/data scheduling. Depending on configuration of each TTI length, a UE performs necessary control monitoring and data procedure.

When different TTI lengths are configured across carriers or within a carrier, in a CA case, handling of cross-carrier scheduling can be handled in different manner.

I-1. Cross-Carrier Scheduling:

(1) Cross-carrier scheduling is not supported between carriers which use different TTI length for unicast control/transmission. That is, a cross-carrier scheduling is not supported if a first TTI for a first carrier (i.e., a first cell) is different from a second TTI for a second carrier (i.e., a second cell) in a length. In other words, the cross-carrier scheduling is supported only if the first TTI for the first carrier (i.e., a first cell) is the same as the second TTI for the second carrier (i.e., the second cell) in the length. If more than one TTI lengths are configured, resources of a specific carrier (e.g., a specific cell) supporting the same TTI length can be cross-carrier scheduled by another carrier which shares the same TTI length. In other words, the TTI length of control/data may be determined by the scheduling carrier configuration regarding TTI length. If this approach is used, a UE should not expect to be configured with cross-carrier scheduling between carrier A and carrier B unless carrier A and carrier B shares at least one TTI length same. Also, if cross-carrier scheduling is configured, it applies only to the same TTI length based scheduling. When a UE is configured with more than one TTI lengths in the scheduled carrier, TTI lengths not same to the scheduling carrier's TTI length should be based on self-carrier scheduling. If there are more than one TTI lengths same across carriers, explicit indication on TTI length where cross-carrier scheduling is applied can be indicated. Or, it is assumed that all the same TTI lengths are scheduled using cross-carrier scheduling.

Figure 5A:
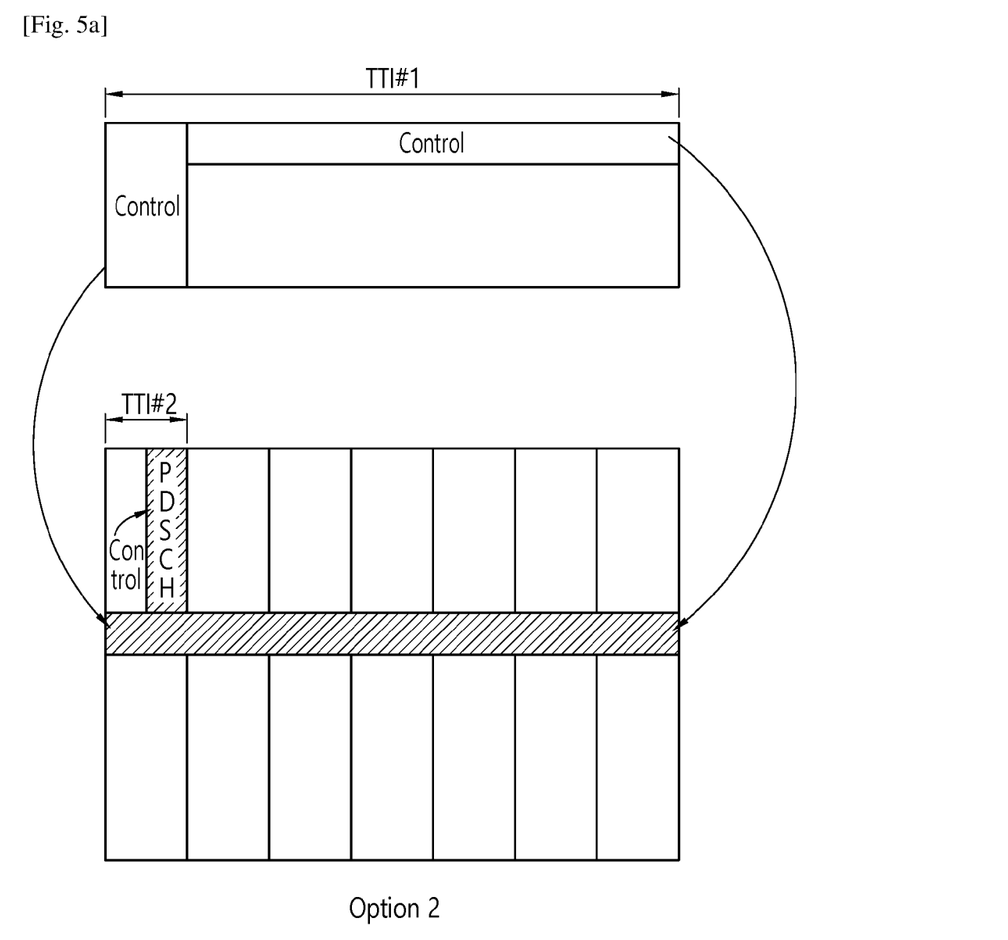
FIGS. 5*a* and 5*b* illustrate examples of cross-carrier scheduling using different TTIs.

(2) Cross-carrier scheduling is supported only for the overlapped control portions between two carriers (i.e., two cells). For example, if a first TTI length used in one carrier (e.g., one cell) is m times of a second TTI length used in another carrier, resources of the second carrier during m*the second TTI length may be scheduled by the first carrier. Referring to FIG. 5a, one example is that PCell uses the legacy TTI (shown as TTI 1 in FIG. 5a) (i.e., one subframe including 14 OFDM symbols) and SCell uses a new TTI (shown as TTI 2 in FIG. 5a) (e.g., two OFDM symbols), control channel of PCell may be used to perform cross-carrier scheduling (i.e., to allocate resources of SCell) such that the control information in the PDCCH region of PCell indicates resources of the Scell during legacy TTI (by approach 1). Similarly, the control information in the enhanced PDCCH (EPDCCH) region of PCell indicates resources of the Scell during legacy TTI (by approach 2). In other words, the approach 1 or 2 may not allocate additional control region in scheduling carrier to support different TTI of scheduled carrier. When the approach 1 or 2 is used, even though a UE is configured with cross-carrier scheduling, the UE would also monitor self-carrier scheduling control regions. In other words, depending on the alignment between two carriers, a UE may monitor both cross-carrier control and self-carrier control regions. One example is that if carrier A operates 1 msec TTI whereas carrier B operates in two TTI lengths of 1 msec and 2OS where the first sTTI of 20S shares control region with 1 msec TTI in every 1 msec (e.g., legacy PDCCH region is shared between two), cross-carrier scheduling via the overlapped control region is possible whereas self-carrier scheduling for other sTTIs within 1 msec is assumed.

Figure 5B:
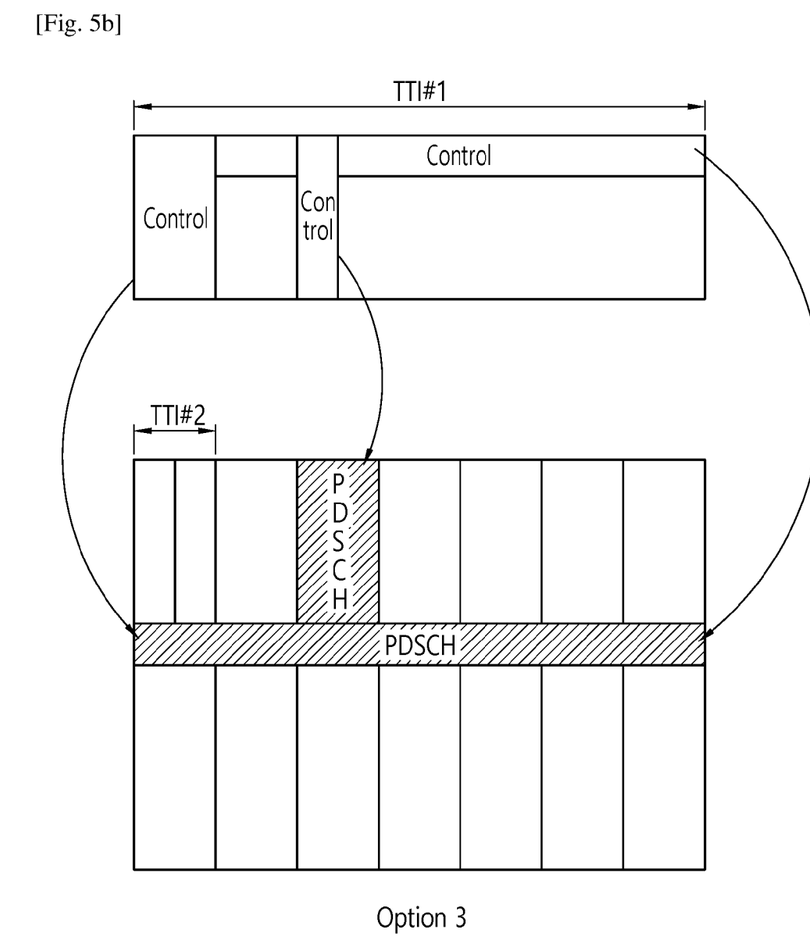

(3) When a UE is configured with cross-carrier scheduling, it is ensured that the scheduling carrier (e.g., any cell used for performing a resource scheduling) supports the TTI length(s) of the scheduled carrier (e.g., another cell whose resources are scheduled by the any cell). For example, referring to FIG. 5b, when cross-carrier scheduling is configured, based on the scheduled carrier's TTI length, a UE monitors only one carrier (i.e., the scheduling carrier).

(4) Another option is similar to (2), whether to use cross-carrier scheduling or self-carrier scheduling may be dependent on downlink control information (DCI) or control channel type. For example, in case where one SCell may not have any legacy PDCCH region as configured with zero length for legacy PDCCH region, any legacy PDCCH for SCell can be configured/transmitted by another cell which can schedule either legacy TTI based PDSCH. Or, cell broadcasted data or a first DCI which can indicate the necessary information for a second-level DCI or DCI for the TTI used in the SCell. For example, if two level DCIs are used to schedule one short PDSCH, the first DCI can be configured by PCell via cross-carrier scheduling whereas the second level DCI can be transmitted by SCell via self-carrier scheduling. Some other partitioning techniques are also possible, where another example is to support cross-carrier scheduling for RACH procedure related messages, and self-carrier scheduling for other unicast control/data transmissions. Another example is to support cross-carrier scheduling based on TTI where the same TTI lengths can be cross-carrier scheduled or self-carrier scheduled depending on the configuration, and different TTI length is assumed to be self-carrier scheduled regardless of self/cross carrier scheduling configuration.

When cross-carrier scheduling is configured, the TTI length of a cell which performs a cross-carrier scheduling can be also configured. In other words, the UE may receive configuration information indicating a length of TTI which is used by any cell for performing a cross-carrier scheduling. When configuration is not given, legacy TTI length is assumed as a default.

On the other hand, if the second TTI for the second cell is shorter than the first TTI for the first cell in a length, the second TTI is used as a unit of a cross-carrier scheduling such that control information for the second cell is received from the first cell in the second TTI. More specifically, it can be refined that a UE can be configured with self-carrier or cross-carrier scheduling per TTI length for the same carrier.

1-2. Physical uplink control channel (PUCCH) transmission

In terms of PUCCH transmission, two cases where a UE is configured with only one uplink carrier or the UE is configured with more than one uplink carriers can be considered.

First when a UE is configured with only one uplink carrier, the followings can be considered.

(1) The UE uses the shortest TTI length, as a reference, among the configured TTI lengths for the uplink transmissions. It is also assumed that other TTI would be "multiple" of the shortest TTI length which then can be repeated 'm' times. For example, if one CC is configured with 2 OFDM symbols for PUCCH transmission, and another CC is configured with 4 OFDM symbols for PUCCH transmission, the transmission is based on 2 OFDM symbol case where 2 times of repetition can be used for 4 OFDM symbols cases. In case, shorter TTI would collide with longer TTI transmission, longer TTI can be dropped at least in shorter TTI level. In other words, some of repetition for longer TTI can be dropped if it partially or fully overlap with shorter TTI PUCCH transmissions. With repetition, when dropping longer TTI, only overlapped portion (which is same as shorter TTI length) can be dropped. This will minimize the impact on longer TTI as long as there is no OCC across repetitions. In case OCC is used, it is assumed that either entire longer TTI PUCCH is dropped or not dropped. This approach however requires all carriers supporting shorter TTI PUCCH transmission. A/N multiplexing, SR transmission, etc would be based on the shortest TTI. One approach to enable this is to configure "TTI" length used for uplink transmission which can be different from PUSCH TTI length semi-statically or dynamically. This approach however may not easily support A/N multiplexing, bundling or legacy CSI feedbacks.

(2) Different TTI length is used depending on the triggered carrier.

In this approach, it may be assumed that A/N multiplexing/bundling among different TTI would not be supported. All CA operation, at least carriers in the same PUCCH group where carriers can share one uplink for UCI transmission, may be assumed to be performed among carriers sharing the same uplink TTI and/or downlink TTI length for unicast control/data transmissions.

(3) collisions.

Figure 6:
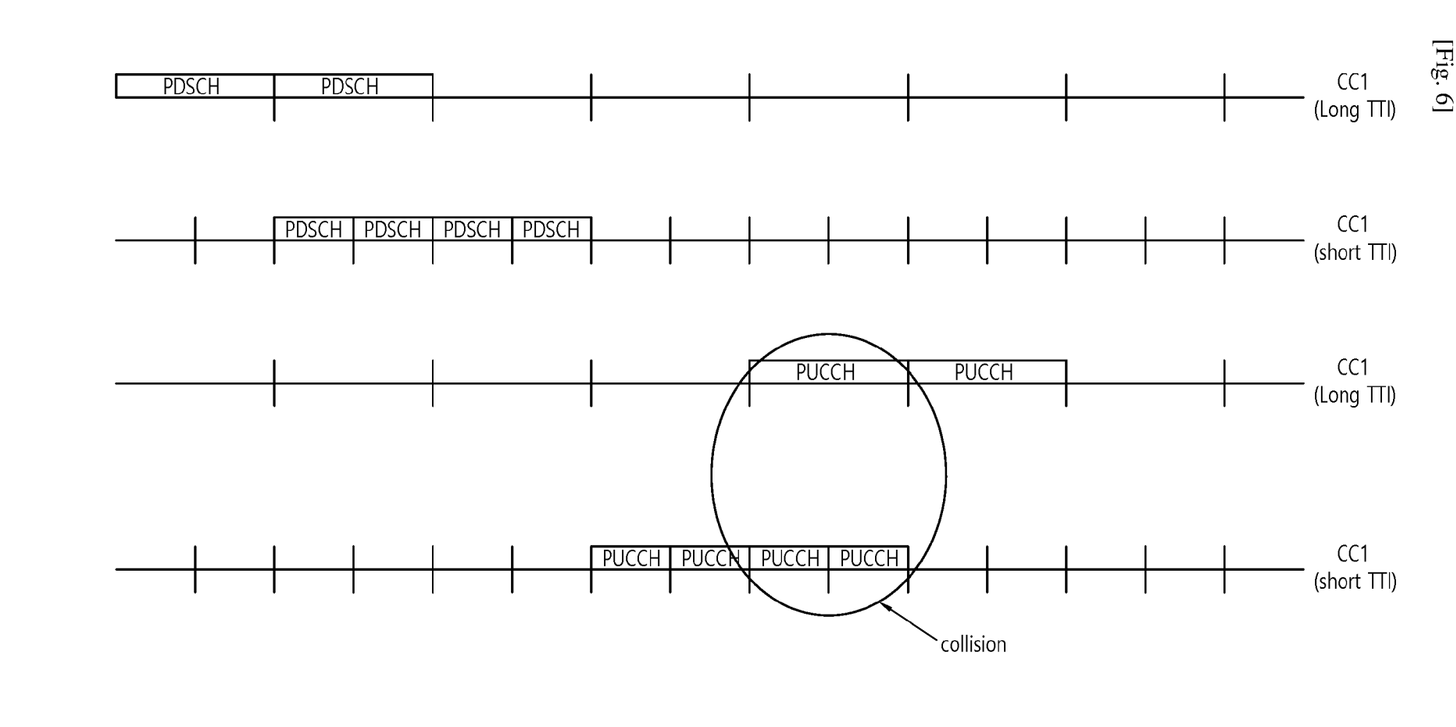
FIGS. 6 and 7 illustrate collisions among different TTI PUCCHs.
Figure 7:
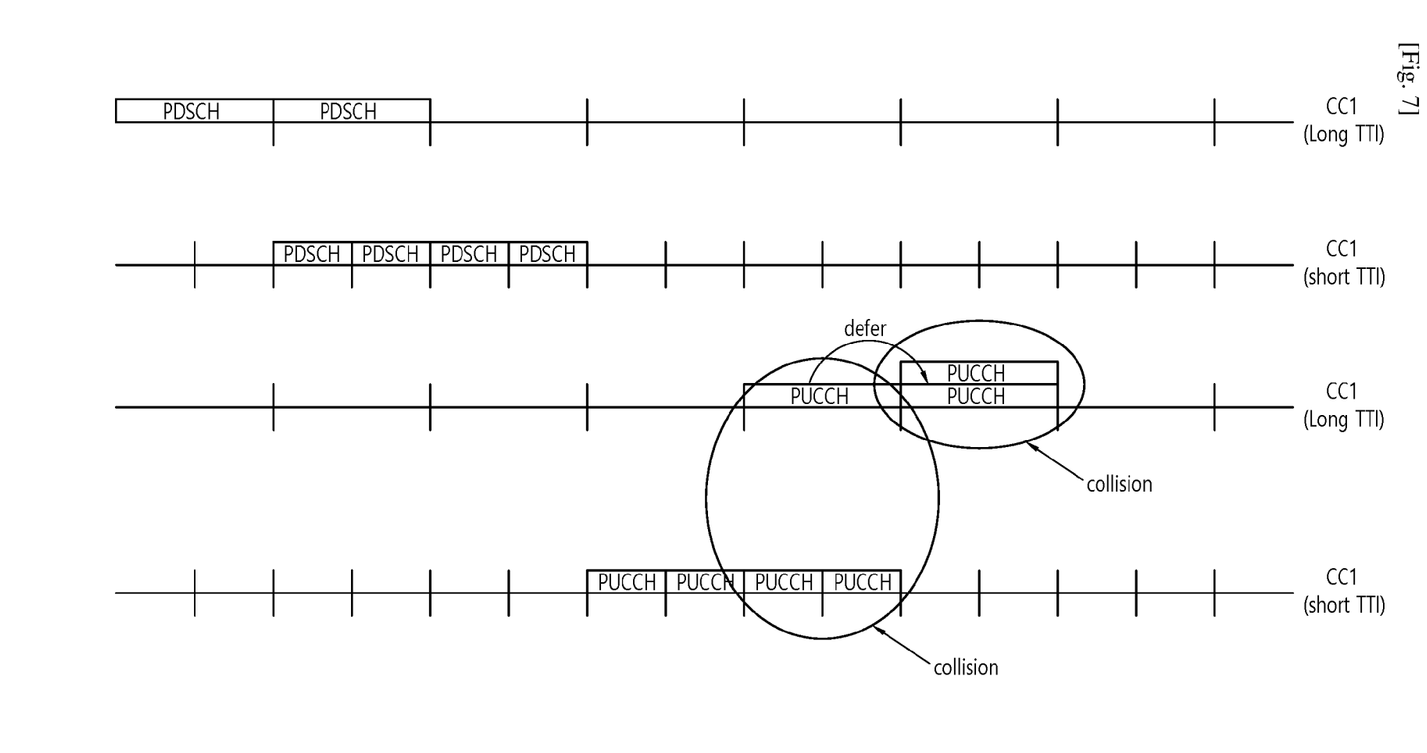

As shown in FIGS. 6 and 7, different TTI based PUCCHs may be collided. In this case, a shorter TTI based PUCCH can be prioritized or on-going transmission can be prioritized.

The collision case can be avoided by the network scheduling. However, if the collision occurs, the following approaches (in addition to already mentioned approaches) can be considered As shown in FIG. 7, longer TTI based PUCCH transmission including uplink control information (UCI) will be deferred to the next available uplink subframe. In other words, the longer TTI may be assumed as "invalid" uplink subframe in case shorter TTI PUCCH or short TTI PUSCH is scheduled in those subframes. To support this, one approach is to configure "A/N or UCI delay" for longer TTI transmission which will be transmitted after n+k+k1 where k1 is the configured/indicated delay counting only valid uplink subframes. This may not be supported by the network which does not support LR. One example of k1 is 1 where the first available subframe would be used for longer (in longer TTI length) TTI PUCCH transmission after n+k where n+k is determined based on the legacy PUCCH timing. However, with this case, there could be collisions between longer TTI (e.g., in CC1 PUCCHs are colliding as shown in below)

This case may be avoided by the network scheduling to configure "k1" properly or a UE may bundle different UCIs in the same long TTI transmissions. In case the network may not avoid the collision, earlier transmission may be prioritized and/or A/N transmission can be prioritized over CSI transmission.

(3) For transmitting the shortened PUCCH, the UE can puncture long PUCCH transmission in the OFDM symbol where short PUCCH transmission occurs. This may not work for PUSCH transmission as the data is mapped time first and frequency second approach. To support this easily, the legacy PUSCH may be transmitted in frequency first and time second approach by not utilizing inter-leaver. Similar approach mentioned for UCI piggyback can be applied in this case.

I-3. Uplink Control Information (UCI) Piggyback

In terms of UCI piggyback, the following cases are considered.

1) PUCCH transmission on one carrier with TTI length 1, and the same duration of TTI length 1, PUSCH transmission on the same carrier with TTI length 2 is scheduled.

1-A). PUCCH TTI>PUSCH TTI: in case PUCCH/PUSCH simultaneous transmission is allowed and configured, both can be transmitted. Note that even though legacy PUCCH and legacy PUSCH may not be enabled to be transmitted simultaneously, it can be configured to simultaneously transmit legacy PUCCH and short PUSCH where additional maximum power reduction (MPR) to support it may be considered further. If simultaneous transmission is not enabled/configured, either PUCCH or PUSCH is dropped. Depending on the priority, one channel may be dropped. Another approach is to postpone or utilize shortened PUCCH format. Depending on the TTI length of PUSCH, different shortened PUCCH formats may be defined and used. This shortened format may be only used for PUCCH format 1/1a/1b. In terms of shortened format may be configured semi-statically or dynamically. When shortened PUCCH format is configured, depending on the location, one or two OFDM symbols may be punctured or not used for long PUCCH transmission. One OFDM symbol is used, shortened PUCCH format may be used where the actual mapping can be different (e.g., shortened PUCCH is mapped to 14 OFDM symbols where one symbol in the middle or in the beginning or in the end can be reserved for short TTI transmission). This however may impact the overall CDM performance of legacy PUCCH transmissions. Thus, this may be performed only for PUCCH format 3/4/5 or very limited by enabled with higher layer signaling. In this case, the resources for long PUCCH format may be configured separately from other legacy PUCCH resources. In other words, one or two OFDM symbols for the existing PUCCH format 3/4/5 may be punctured thereby being shortened. For other PUCCH format 1 or PUCCH format with OCC for multiplexing of multiple UEs, to minimize impact on other UEs, it can be considered to give priority on on-going transmission.

1-B). PUCCH TTI<PUSCH TTI: generally, it may not be essential to deliver short PUCCH by dropping long TTI PUSCH. Thus, in this case, UCI piggyback on PUSCH may be allowed.

2) PUCCH transmission on one carrier with TTI length 1, and the same duration of TTI length 1, PUSCH transmission on the same carrier with TTI length 2 is scheduled and also PUSCH transmission on a carrier with TTI length 1 is scheduled 2-A). The carrier of PUSCH with TTI 1 is the same as the carrier of PUCCH with TTI 1

2-B). The carrier of PUSCH with TTI 1 is different from the carrier of PUCCH with TTI 1

In terms of operation, it may be assumed that carrier group or PUCCH group or TAG group or CG (MCG or SCG) may not be crossed to support any PUCCH/PUSCH related operation mentioned in this invention. Alternatively, the grouping between carriers with different TTI can be formed independently of those configured groups. For example, if there are two groups where two PUCCH cells can be configured, further grouping based on TTI length can be possible where one PUCCH may be transmitted per the group based on TTI length. More generally, the grouping of carriers with different TTI lengths can have multiple options as follows.

The total number of TTI lengths across the configured downlink TTIs cannot exceed the number of activated PUCCH capable uplink carriers. If two UL carriers are available, and each can transmit PUCCH, maximum two TTI lengths can be configured for unicast control and/or data transmission for downlink The total number of TTI length across the configured uplink TTIs cannot exceed the number of activated PUCCH capable uplink carriers This may restrict the TTI length of UCCH instead of overall TTI length of uplink transmission Carriers are grouped in a set of PUCCH carrier groups or DC carrier groups. In one carrier group, one or more TAGs can be configured. TTI length would follow TTI length of the Pcell or PSCell or PUCCH cell configured per each TAG. This may apply only for PUCCH, and TTI length for PUSCH may be used differently.

Carriers are grouped in a set of PUCCH carrier groups or DC carrier groups. In one carrier group, one or more TAGs can be configured. One TAG may be further configured or one PUCCH carrier groups can be further grouped to one or more groups with sharing the same TTI.

One approach is to follow "UL (and possibly DL) TTI length" configured on PUCCH cell per CG or PUCCH group. For PUSCH, it may follow groups configured by TTI length. UCI piggyback may perform only when TTI length of PUCCH and PUSCH is the same. Otherwise, the above rule may be applied. In terms of grouping, one TTI length which can be multiplied by the shorted TTI can belong to the one group. However, if they are not in the relationship of multiple, it may not be multiplexed. More specifically, OFDM symbol length 14 may be multiplexed with any TTI length as integer number of short TTIs can belong to the legacy subframe. 7 OFDM symbol length short TTI can be only multiplexed with either 4/3 OFDM symbol short TTI and legacy TTI, 2 OFDM symbol length short TTI can be multiplexed with legacy TTI. In terms of making a group to share the same PUCCH, which can be either based on the shortest TTI length among carriers belonging to the same group or based on legacy TTI, this relationship is guaranteed by the network.

Figure 8:
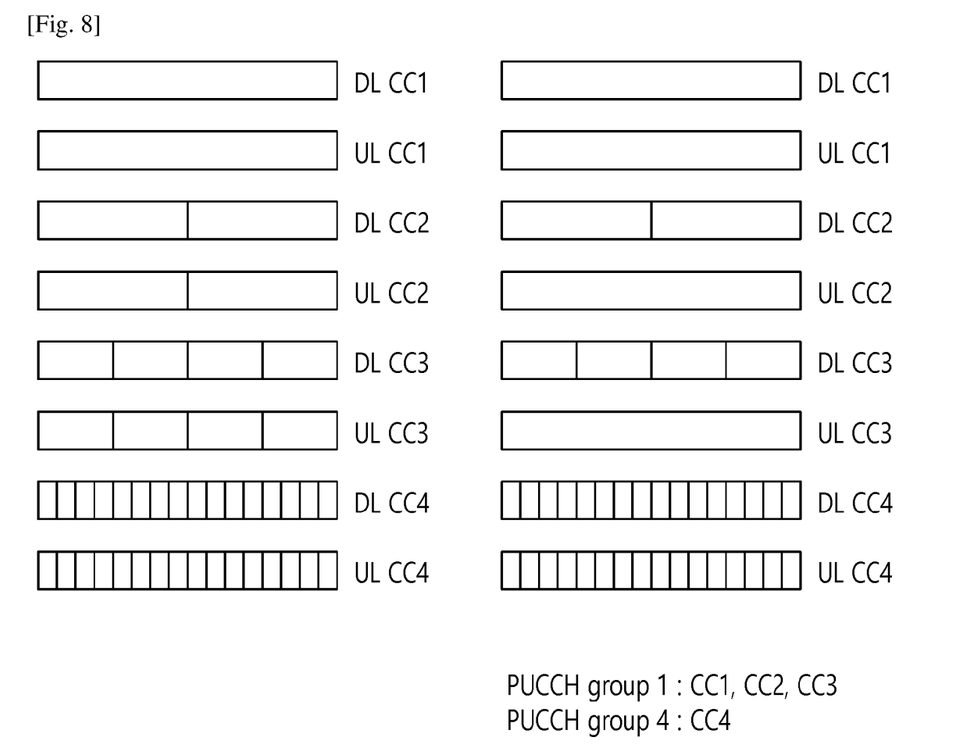
FIG. 8 shows one example of grouping a plurality of CCs having the same TTI length.

FIG. 8 shows one example of grouping a plurality of CCs having the same TTI length.

In terms of PUSCH short TTI length, all cells belonging to the same PUCCH group may use the same TTI length or allow different length. If the shortest TTI is used for PUCCH transmission, piggyback can be applied for PUSCH transmission similar to the legacy procedure where instead of SCell index (if there are multiple PUSCH transmissions at the same time), shortest TTI (or largest TTI) may be used for UCI piggyback. In case, one or more cells do not support short TTI, one uplink with legacy TTI is assumed.

I-4. Scheduling Request (SR)/Power Headroom Report (PHR)

Per TTI length, different PHR and/or SR can be triggered.

II. Case 2 or 3

When different numerology is assumed, multiplexing of different TTI and/or numerology seems not easily doable at the same time. In this sense, some type of TDM is assumed for different numerology. In the same subframe sharing the same numerology, Case 1 approaches can be applied.

The embodiments illustrated above may be implemented by various instruments. For example, the embodiments of the present invention may be implemented by hardware, firmware, software, or combinations thereof, which will be described in detail with reference to FIG. 9.

Figure 9:
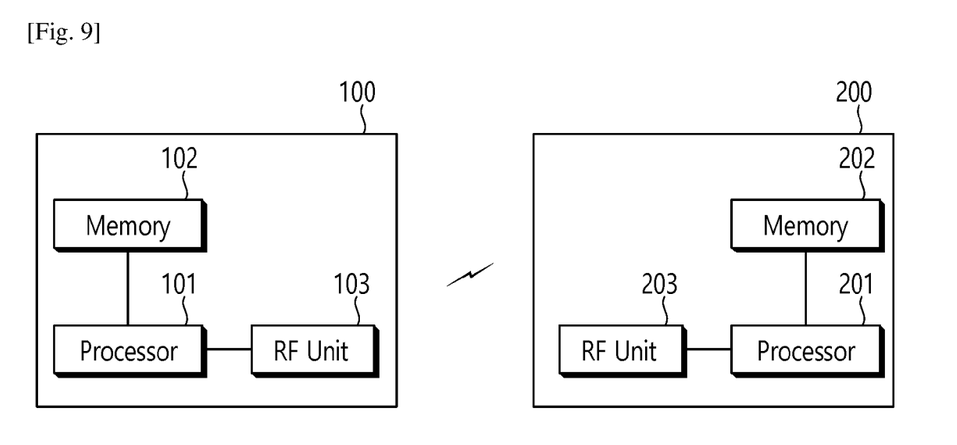
FIG. 9 is a block diagram illustrating a wireless communication system according to an embodiment of the present invention.

FIG. 9 is a Block Diagram Illustrating a Wireless Communication System According to an Embodiment of the Present Invention.

A BS 200 includes a processor 201, a memory 202, and an RF (radio frequency) unit 203. The memory 202 coupled to the processor 201 stores a variety of information for driving the processor 201. The RF unit 203 coupled to the processor 201 transmits and/or receives a radio signal. The processor 201 implements the proposed functions, procedure, and/or methods. In the aforementioned embodiment, an operation of the BS may be implemented by the processor 201.

A wireless device 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods. In the aforementioned embodiment, an operation of the wireless device may be implemented by the processor 101.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

The invention claimed is:

1. A method for monitoring control information, the method performed by a user equipment (UE) configured with an aggregation of a first cell and a second cell and the method comprising:
    monitoring, by the UE, control information in at least one of a control region of the first cell or a control region of second cell, wherein the first cell uses a first transmission time interval (TTI) and the second cell uses a second TTI, and wherein a length of the second TTI is shorter than a length of the first TTI; and
    receiving, from the second cell, a physical downlink shared channel (PDSCH) based on the second TTI,
    wherein the PDSCH based on the second TTI is scheduled based on both first control information received in the control region of the first cell and second control information received in the control region of the second cell.

2. The method of claim 1, wherein based on that the length of the first TTI for the first cell is m times the length of the second TTI for the second cell, a cross-carrier scheduling is configured such that the control information of the first cell indicates resource allocation of the second cell in m TTIs, and
    wherein the m is an integer with a range of 2 to 14.

3. The method of claim 1, wherein the second TTI is used as a unit of a cross-carrier scheduling.

4. The method of claim 3, wherein control information for the second cell is received from the first cell in the second TTI.

5. The method of claim 1, wherein a cross-carrier scheduling is independently configured for the first TTI length and the second TTI length, respectively.

6. The method of claim 1, further comprising:
    receiving configuration information indicating a length of TTI which is used by any cell for performing a cross-carrier scheduling.

7. A method for transmitting an uplink control channel, the method performed by a user equipment (UE) and comprising:
    transmitting the uplink control channel, wherein based on that the uplink control channel is a first uplink control channel, which is generated based on a first transmission time interval (TTI) shorter than a second TTI, the uplink control channel is repeatedly transmitted by m times within the second TTI, and wherein the m is an integer with range of 2 to 14; and
    based on the first uplink control channel, which is generated based on the first TTI, overlapping on one or more orthogonal frequency division multiplexing (OFDM) symbols with a second uplink control channel which is generated based on the second TTI, puncturing the one or more OFDM symbols for the second uplink control channel, wherein the puncturing is performed based on that the first TTI for the first uplink control channel is shorter than the second TTI for the second uplink control channel.

8. The method of claim 7, wherein the uplink control channel includes a plurality of hybrid automatic repeat request (HARD) acknowledgements/negative-acknowledgements (ACKs/NACKs) which are multiplexed based on one identical TTI among the first and second TTIs.

9. The method of claim 7, wherein the uplink control channel does not include a plurality of HARQ ACKs/NACKs which are multiplexed based on the first and second TTIs, respectively.

10. The method of claim 7, wherein based on the first uplink control channel, which is generated based on the first TTI, overlapping on one or more orthogonal frequency division multiplexing (OFDM) symbols with the second uplink control channel which is generated based on the second TTI, transmission of the second uplink control channel is delayed to a next available uplink subframe.

11. The method of claim 10, wherein based on the second uplink control channel, which is generated based on the second TTI, overlapping with a third uplink control channel which is generated based on the second TTI within the next available uplink subframe, the second uplink control channel is transmitted and the third uplink control channel is not transmitted based on that the second uplink control channel is prioritized over the third uplink control channel.

12. The method of claim 7, wherein the puncturing of the second uplink control channel does not affect multiplexing of uplink control channels.

* * * * *